(12) United States Patent
Belvin et al.

(10) Patent No.: US 7,949,610 B2
(45) Date of Patent: May 24, 2011

(54) METHOD AND SYSTEM FOR DISCOVERING DEPENDENCIES IN PROJECT PLANS OF DISTRIBUTED SYSTEM

(75) Inventors: Marcus Lee Belvin, Raleigh, NC (US); Thomas Joel Caswell, Apex, NC (US); Angela Richards Jones, Durham, NC (US); Henri Fouotsop Meli, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 771 days.

(21) Appl. No.: 12/023,418

(22) Filed: Jan. 31, 2008

(65) Prior Publication Data

US 2009/0198531 A1 Aug. 6, 2009

(51) Int. Cl.
*G06Q 10/00* (2006.01)
*G06F 9/44* (2006.01)
(52) U.S. Cl. .......... 705/301; 705/1.1; 705/300; 717/101
(58) Field of Classification Search .................. 705/1.1, 705/300–301
See application file for complete search history.

(56) References Cited

U.S. PATENT DOCUMENTS

| | | | |
|---|---|---|---|
| RE038,633 E | | 10/2004 | Srinivasan |
| 7,055,130 B2 * | | 5/2006 | Charisius et al. ............. 717/108 |
| 7,139,719 B1 | | 11/2006 | Cherneff et al. |
| 2003/0055702 A1 | | 3/2003 | Waterston |
| 2004/0002885 A1 | | 1/2004 | Levy |
| 2005/0262471 A1 * | | 11/2005 | Wagner et al. ................ 717/101 |
| 2006/0026049 A1 | | 2/2006 | Joseph et al. |
| 2006/0070020 A1 * | | 3/2006 | Puttaswamy et al. ......... 717/101 |
| 2006/0173726 A1 | | 8/2006 | Hall et al. |

OTHER PUBLICATIONS

Herroelen, Willy. "Project Scheduling-Theory and Practice". Production &Operations Mangement. v14n4 pp: 413-432. Winter 2005.*
Matos et al.; SQL-based Discovery of Exact and Approximate Functional Dependencies; SIGCSE Bulletin, Vol. 36, No. 4, Dec. 2004; pp. 58-63.
Create Task Dependencies (Links) Across Projects; 2 pages; http://office.microsoft.com/en-us/project/HA101308651033.aspx.
Managing Project Dependencies; 3 pages; www.oracle.com/webapps/online-help/fdeveloper/10.1.3?topic=ide_pprojpropsmanageprojectdependencies_html.
Create and Manage Inter-Project Dependencies; 6 pages; office.microsoft.com/en-us/project/HA101230571033.aspx.

* cited by examiner

*Primary Examiner* — Jamisue A Plucinski
*Assistant Examiner* — Candice D Carter
(74) *Attorney, Agent, or Firm* — Schmeiser, Olsen & Watts; John R. Pivnichny

(57) ABSTRACT

A method and system for discovering dependencies in project plans of a distributed system. Project plans are located by a project plan path. A project plan contains dependency information of a task to be performed, a resource necessary to perform the task, and a prerequisite task to perform the task. The method generates a master project plan containing all dependency information in all project plans in the distributed system, which dictates an order of tasks or task-resource maps in all project plans pursuant to the dependency information in project plans. The method utilizes project plan files in diverse formats in generating the master project plan for the distributed system.

25 Claims, 6 Drawing Sheets

DISTRIBUTED SYSTEM FOR DISCOVERING DEPENDENCIES AMONG PROJECT PLANS
100

DISTRIBUTED SYSTEM FOR DISCOVERING
DEPENDENCIES AMONG PROJECT PLANS
100

METHOD AND SYSTEM FOR DISCOVERING DEPENDENCIES IN PROJECT PLANS OF DISTRIBUTED SYSTEM

FIELD OF THE INVENTION

The present invention discloses a method and associated system for discovering dependencies among tasks and resources in project plans distributed across a project management system.

BACKGROUND OF THE INVENTION

In conventional project management solutions, dependencies among project plans and required resource are not represented. Also, project plans must use a specific data format designated by a project management solution. Consequently, it is difficult to change a project plan and changing the project plan is more prone to cause unexpected delay in performing a task dependent on certain resources. Moreover, project plans described in a different data format cannot participate in a master project plan for a distributed project plan.

Thus, there is a need for a method and associated system that overcomes at least one of the preceding disadvantages of current methods and systems for discovering dependencies in distributed project plans.

SUMMARY OF THE INVENTION

The present invention provides a method for discovering dependencies among at least two project plans in a distributed system comprising at least one project node that is a computer system, wherein an initial value of a project plan count j is 1, the method comprising:

fetching, from a project plan path, a j-th location value PATH[j] that locates a j-th project plan PLAN[j], the project plan path being stored in a storage medium accessible by a current project node of said at least one project node, wherein the j-th location value PATH[j] is local or remote to the current project node, wherein the project plan path comprises L location values (PATH[1], PATH[2], ..., PATH[L]) locating all project plans (PLAN[1], PLAN[2], ..., PLAN[L]), respectively, in the distributed system, wherein L is a positive integer representing the number of project plans in the distributed system, wherein j is a positive integer that is not greater than L;

subsequent to said fetching, opening the j-th project plan PLAN[j] that is located by the j-th location value PATH[j], wherein the j-th project plan PLAN[j] is a file comprising $M_j$ dependency data tuples (D[j][1], ..., D[j][k], ..., D[j][$M_j$]), wherein a k-th dependency data tuple of the j-th project plan D[j][k] comprises (TASK[j][k], PREREQUISITE_TASK[j][k]), wherein TASK[j][k] represents a task in a k-th dependency data tuple of the j-th project plan PLAN[j] and PREREQUISITE_TASK[j][k] represents a prerequisite task that need to be completed prior to performing TASK[j][k], wherein $M_j$ is a positive integer representing the number of dependency data tuples in PLAN[j], wherein k is a dependency data tuple count which is a positive integer that is initially 1 and that is not greater than $M_j$;

subsequent to said opening, processing a task loop for each k in the range of 1 to $M_j$, the task loop comprising:

discovering a dependency DEPENDENCY[j][k] for TASK[j][k] comprising an ordered set (PREREQUISITE_TASK[j][k], TASK[j][k]) which defines an order of execution such that TASK[j][k] begins after PREREQUISITE_TASK[j][k] is completed;

subsequent to said discovering, inserting the dependency DEPENDENCY[j][k] from said discovering into a master project plan, wherein the master project plan comprises a collection of all discovered dependencies in the distributed system determining at least one order for performing tasks in said at least two project plans;

subsequent to said inserting, increasing k by one;

subsequent to said increasing k, iteratively looping back to said discovering, said inserting, and said increasing k, while k is not greater than $M_j$; and upon k exceeding $M_j$, exiting the task loop;

subsequent to said processing, increasing j by one;

subsequent to said increasing j, iteratively looping back to said fetching, said opening, said processing, and said increasing j, while j is not greater than L; and upon j exceeding L, communicating the master project plan to a user of the distributed system, wherein the current project node performs said fetching, said opening, said processing, said increasing j, said looping, and said communicating.

The present invention provides a computer program product, comprising a computer usable storage medium having a computer readable program code embodied therein, said computer readable program code containing instructions that when executed by a processor of a computer system implement a method for discovering dependencies among at least two project plans in a distributed system comprising at least one project node that is a computer system, wherein an initial value of a project plan count j is 1, the method comprising:

fetching, from a project plan path, a j-th location value PATH[j] that locates a j-th project plan PLAN[j], the project plan path being stored in a storage medium accessible by a current project node of said at least one project node, wherein the j-th location value PATH[j] is local or remote to the current project node, wherein the project plan path comprises L location values (PATH[1], PATH[2], ..., PATH[L]) locating all project plans (PLAN[1], PLAN[2], ..., PLAN[L]), respectively, in the distributed system, wherein L is a positive integer representing the number of project plans in the distributed system, wherein j is a positive integer that is not greater than L;

subsequent to said fetching, opening the j-th project plan PLAN[j] that is located by the j-th location value PATH[j], wherein the j-th project plan PLAN[j] is a file comprising $M_j$ dependency data tuples (D[j][1], ..., D[j][k], ..., D[j][$M_j$]), wherein a k-th dependency data tuple of the j-th project plan D[j][k] comprises (TASK[j][k], PREREQUISITE_TASK[j][k]), wherein TASK[j][k] represents a task in a k-th dependency data tuple of the j-th project plan PLAN[j] and PREREQUISITE_TASK[j][k] represents a prerequisite task that need to be completed prior to performing TASK[j][k], wherein $M_j$ is a positive integer representing the number of dependency data tuples in PLAN[j], wherein k is a dependency data tuple count which is a positive integer that is initially 1 and that is not greater than $M_j$;

subsequent to said opening, processing a task loop for each k in the range of 1 to $M_j$, the task loop comprising:

discovering a dependency DEPENDENCY[j][k] for TASK[j][k] comprising an ordered set (PREREQUISITE_TASK[j][k], TASK[j][k]) which defines an order of execution such that TASK[j][k] begins after PREREQUISITE_TASK[j][k] is completed;

subsequent to said discovering, inserting the dependency DEPENDENCY[j][k] from said discovering into a master project plan, wherein the master project plan comprises a collection of all discovered dependencies in the distributed system determining at least one order for performing tasks in said at least two project plans;

subsequent to said inserting, increasing k by one;

subsequent to said increasing k, iteratively looping back to said discovering, said inserting, and said increasing k, while k is not greater than $M_j$; and upon k exceeding $M_j$, exiting the task loop;

subsequent to said processing, increasing j by one;

subsequent to said increasing j, iteratively looping back to said fetching, said opening, said processing, and said increasing j, while j is not greater than L; and upon j exceeding L, communicating the master project plan to a user of the distributed system, wherein the current project node performs said fetching, said opening, said processing, said increasing j, said looping, and said communicating.

The present invention provides a computer system comprising a processor and a computer readable memory unit coupled to the processor, said memory unit containing instructions that when executed by the processor implement a method for discovering dependencies among at least two project plans in a distributed system comprising at least one project node that is a computer system, wherein an initial value of a project plan count j is 1, the method comprising:

fetching, from a project plan path, a j-th location value PATH[j] that locates a j-th project plan PLAN[j], the project plan path being stored in a storage medium accessible by a current project node of said at least one project node, wherein the j-th location value PATH[j] is local or remote to the current project node, wherein the project plan path comprises L location values (PATH[1], PATH[2], ..., PATH[L]) locating all project plans (PLAN[1], PLAN[2], ..., PLAN[L]), respectively, in the distributed system, wherein L is a positive integer representing the number of project plans in the distributed system, wherein j is a positive integer that is not greater than L;

subsequent to said fetching, opening the j-th project plan PLAN[j] that is located by the j-th location value PATH[j], wherein the j-th project plan PLAN[j] is a file comprising $M_j$ dependency data tuples (D[j][1], ..., D[j][k], ..., D[j][$M_j$]), wherein a k-th dependency data tuple of the j-th project plan D[j][k] comprises (TASK[j][k], PREREQUISITE_TASK[j][k]), wherein TASK[j][k] represents a task in a k-th dependency data tuple of the j-th project plan PLAN[j] and PREREQUISITE_TASK[j][k] represents a prerequisite task that need to be completed prior to performing TASK[j][k], wherein $M_j$ is a positive integer representing the number of dependency data tuples in PLAN[j], wherein k is a dependency data tuple count which is a positive integer that is initially 1 and that is not greater than $M_j$;

subsequent to said opening, processing a task loop for each k in the range of 1 to $M_j$, the task loop comprising:

discovering a dependency DEPENDENCY[j][k] for TASK[j][k] comprising an ordered set (PREREQUISITE_TASK[j][k], TASK[j][k]) which defines an order of execution such that TASK[j][k] begins after PREREQUISITE_TASK[j][k] is completed;

subsequent to said discovering, inserting the dependency DEPENDENCY[j][k] from said discovering into a master project plan, wherein the master project plan comprises a collection of all discovered dependencies in the distributed system determining at least one order for performing tasks in said at least two project plans;

subsequent to said inserting, increasing k by one;

subsequent to said increasing k, iteratively looping back to said discovering, said inserting, and said increasing k, while k is not greater than $M_j$; and upon k exceeding $M_j$, exiting the task loop;

subsequent to said processing, increasing j by one;

subsequent to said increasing j, iteratively looping back to said fetching, said opening, said processing, and said increasing j, while j is not greater than L; and upon j exceeding L, communicating the master project plan to a user of the distributed system, wherein the current project node performs said fetching, said opening, said processing, said increasing j, said looping, and said communicating.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a method for discovering dependencies among at least two project plans in a distributed system comprising at least one project node that is a computer system, wherein an initial value of a project plan count j is 1, the method comprising:

fetching, from a project plan path, a j-th location value PATH[j] that locates a j-th project plan PLAN[j], the project plan path being stored in a storage medium accessible by a current project node of said at least one project node, wherein the j-th location value PATH[j] is local or remote to the current project node, wherein the project plan path comprises L location values (PATH[1], PATH[2], ..., PATH[L]) locating all project plans (PLAN[1], PLAN[2], ..., PLAN[L]), respectively, in the distributed system, wherein L is a positive integer representing the number of project plans in the distributed system, wherein j is a positive integer that is not greater than L;

subsequent to said fetching, opening the j-th project plan PLAN[j] that is located by the j-th location value PATH[j], wherein the j-th project plan PLAN[j] is a file comprising $M_j$ dependency data tuples (D[j][1], ..., D[j][k], ..., D[j][$M_j$]), wherein a k-th dependency data tuple of the j-th project plan D[j][k] comprises (TASK[j][k], PREREQUISITE_TASK[j][k]), wherein TASK[j][k] represents a task in a k-th dependency data tuple of the j-th project plan PLAN[j] and PREREQUISITE_TASK[j][k] represents a prerequisite task that need to be completed prior to performing TASK[j][k], wherein $M_j$ is a positive integer representing the number of dependency data tuples in PLAN[j], wherein k is a dependency data tuple count which is a positive integer that is initially 1 and that is not greater than $M_j$;

subsequent to said opening, processing a task loop for each k in the range of 1 to $M_j$, the task loop comprising:

discovering a dependency DEPENDENCY[j][k] for TASK[j][k] comprising an ordered set (PREREQUISITE_TASK[j][k], TASK[j][k]) which defines an order of execution such that TASK[j][k] begins after PREREQUISITE_TASK[j][k] is completed;

subsequent to said discovering, inserting the dependency DEPENDENCY[j][k] from said discovering into a master project plan, wherein the master project plan comprises a collection of all discovered dependencies in the distributed system determining at least one order for performing tasks in said at least two project plans;

subsequent to said inserting, increasing k by one;

subsequent to said increasing k, iteratively looping back to said discovering, said inserting, and said increasing k, while k is not greater than $M_j$; and upon k exceeding $M_j$, exiting the task loop;

subsequent to said processing, increasing j by one;

subsequent to said increasing j, iteratively looping back to said fetching, said opening, said processing, and said increasing j, while j is not greater than L; and upon j exceeding L, communicating the master project plan to a user of the distributed system, wherein the current project node performs said fetching, said opening, said processing, said increasing j, said looping, and said communicating.

The present invention provides a method and system that overcomes at least one of the current disadvantages of conventional method and system for discovering a dependency among project plans in distributed system.

DETAILED DESCRIPTION OF THE INVENTION

In modern project management systems, project plans are rarely performed on a single computer system but are usually distributed throughout a group of computer systems. A distributed project plan is defined as a group of project plans that exists in multiple data formats and multiple physical locations. A project plan is a file that comprises a list of tasks to be performed in a predefined order. A task is a unit of work in a project plan. A task requires certain resources to be performed as defined in the project plan. A resource refers to a unit necessary to complete a task. A resource may be, inter alia, a person, a machine, etc.

A horizontal dependency refers to a dependency between resources that are required to complete a single task. In a case to complete a task that requires multiple resources, all resources should be simultaneously available for the task. Thus, each resource in a group of resources that is required for a single task can be said to be horizontally dependent on the rest of the resources. A task may be dependent on other tasks when the task requires that other tasks had previously been completed to begin the task at hand. Such sequential dependency may be referred to as a vertical dependency, which directs an order of tasks to be performed.

In this specification, a horizontal dependency among resources and a vertical dependency among tasks can be used interchangeably, because a task may indirectly depend on a resource through a combination of horizontal and vertical dependencies. Both types of dependencies may generally be referred to as a dependency without further qualification.

In conventional project scenarios involving multiple parties, one party might be delayed in performing a task to wait for a resource that should be provided by another party. In a case that a required resource is controlled by a third party, it is difficult for parties in the project to be aware of such dependencies in advance because of the indirect dependencies. In a conventional project scenario, such hidden dependencies cause costly delays.

By means of an example, a conventional project planning solution that is commercially available cannot discover dependencies among project plans. In the conventional project planning solution, a user is required to explicitly define dependent project plans for each project plan for a master project plan. Thus, dependencies among project plans may not be represented in the master project plan. Also, file formats describing project plans that are not native to the conventional project planning solution will not be included in the master project plan.

The method of the present invention enables automatic discovery of dependencies among project plans distributed across a group of computer systems. Also, a user of the present invention may use non-native file formats for a project plan.

Figure 1:
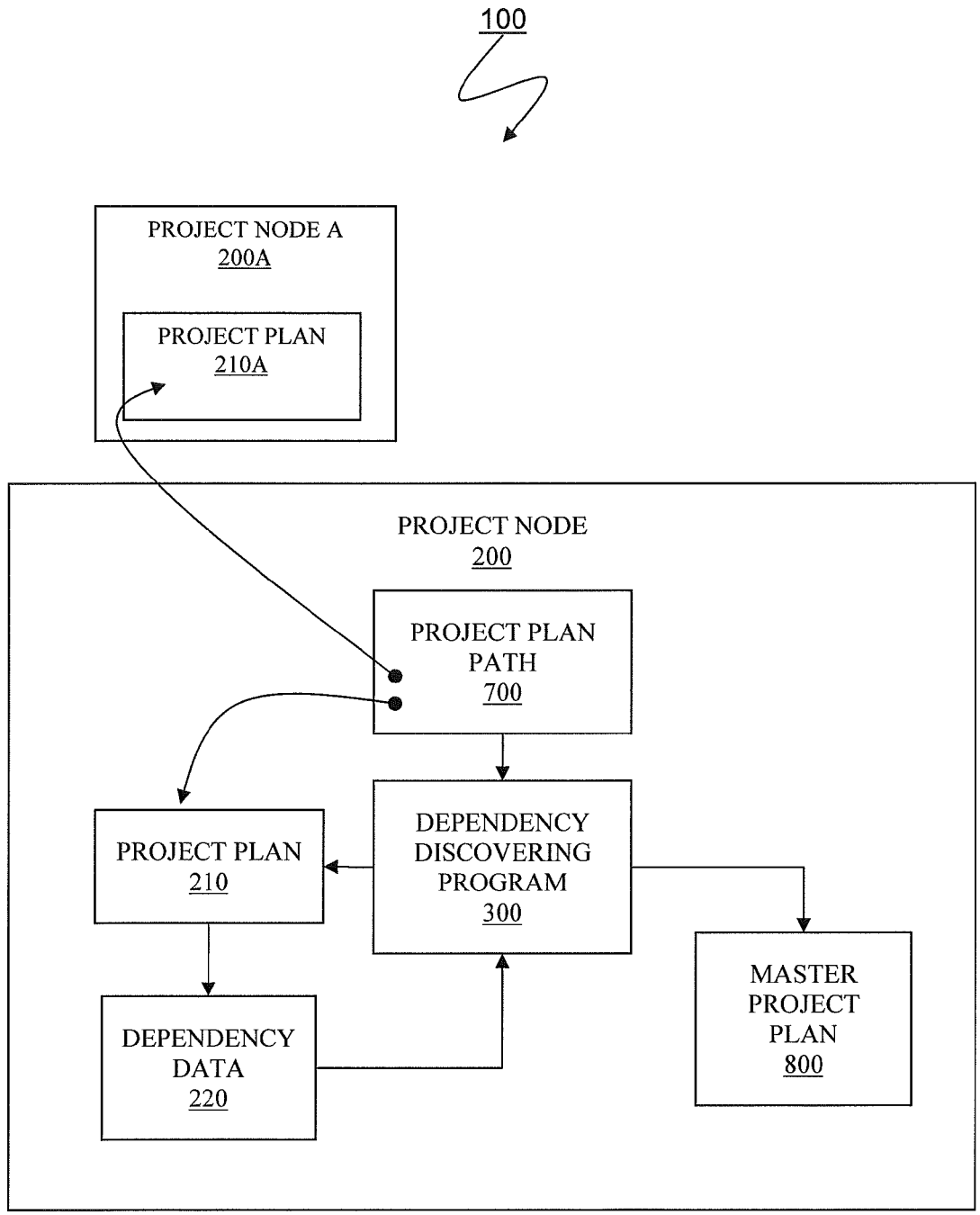
FIG. 1 illustrates a distributed system for discovering dependencies in project plans of the distributed system, in accordance with embodiments of the present invention.

FIG. 1 illustrates a distributed system 100 for discovering dependencies in project plans of the distributed system, in accordance with embodiments of the present invention.

The distributed system 100 comprises at least one project node 200, 200A. A first project node 200 comprises a first project plan 210, dependency data 220, a project plan path 700, a dependency discovering program 300, and a master project plan 800. A second project node 200A that comprises a second project plan 210A is remote to the dependency discovering program 300 that is hosted by the first project node 200.

A project plan path 700 in the project node 200 comprises at least one path value that each of said at least one path value locates a project plan in a project node in the distributed system 100. In this embodiment, the project plan path 700 comprises two path values, wherein a first path value locates the first project plan 210 in the first project node 200, and a second path value locates the second project plan 210A in the second project node 200A. Path values may be, inter alia, in Uniform Resource Locator (URL) format to locate and retrieve any local or remote project plan files. The project plan path 700 may be stored as, inter alia, a system variable of each project node 200 represented as a CLASSPATH or PATH variable in the Java programming language. The dependency discovering program 300 retrieves path values from the project plan path 700 and locates a project plan 210.

In one embodiment of the present invention, the project plan path 700 is a system variable that is stored in the operating system of a project node 200. In another embodiment of the present invention, the project plan path 700 is stored as a local variable of the dependency discovering program 300.

The project plan 210 is a file comprising tasks to execute the project plan and dependency information for tasks. Dependency information may be, inter alia, a prerequisite task to be completed to begin performing the task, a resource necessary to perform the task, etc. The dependency discovering program parses the project plan and generates dependency data 220 which comprises a task, a necessary resource to perform the task, and a prerequisite task to be completed prior to performing the task. The project plan 210 is written in any file format that can be parsed by a separate parser for the file format.

A master project plan 800 comprising an integration of all discovered dependencies in all project plans of the distributed system 100 is generated by the dependency discovering program 300. The master project plan 800 dictates at least one order for executing tasks in all project plans in the distributed system 100.

The dependency discovering program 300 of the present invention builds the master project plan 800 from the dependency data 220 by processing each project plan located by the project plan path 700. The master project plan 800 is completed after the dependency discovering program 300 processes all project plans in the distributed system.

Figure 2:
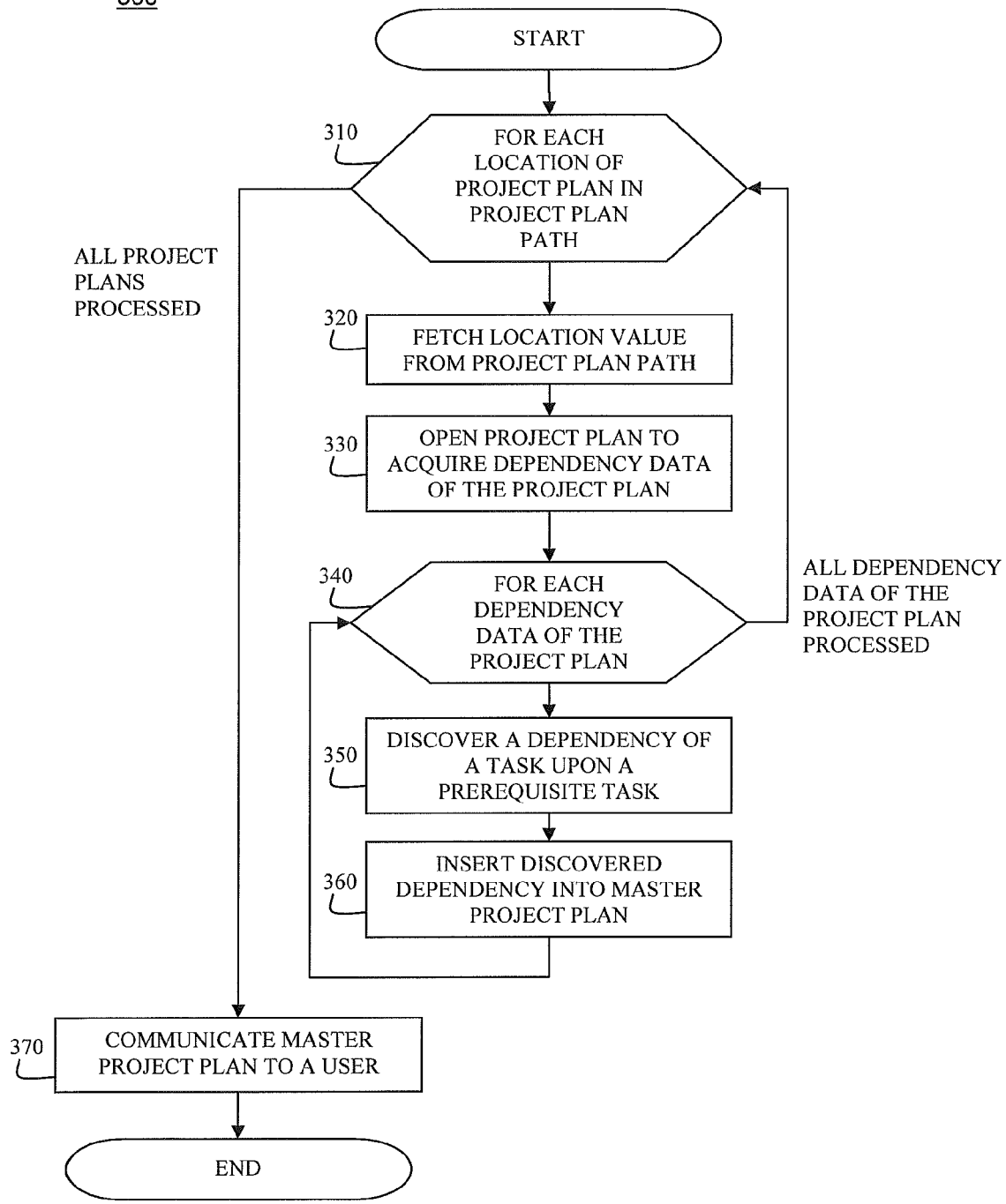
FIG. 2 is a flowchart depicting a method for discovering dependencies in project plans of the distributed system of FIG. 1, in accordance with the embodiments of the present invention.

FIG. 2 is a flowchart depicting a method for discovering dependencies in project plans of the distributed system of FIG. 1, supra, in accordance with the embodiments of the present invention.

In step 310, a dependency discovering program of the present invention iterates steps 320 to 340 for each location PATH[j] of a project plan PLAN[j] stored in the project plan path of the current project node on which the dependency discovering program is executed, wherein j counts a number of project plan that is being processed. There are L locations of project plans, PLAN[1] to PLAN[L], wherein L is a positive integer representing the number of project plans stored in the project plan path. Upon completing steps 320 to 340 for all project plans located by the project plan path in the distributed system, the dependency discovering program proceeds to step 370 to communicate a master project plan of the distributed system to a user.

In step 320, the dependency discovering program fetches a location value PLAN[j] from the project plan path to access the project plan.

In step 330, the dependency discovering program opens the project plan located in step 320 and acquires dependency data, D[j][1] to D[j][$M_j$], of the project plan PLAN[j], wherein $M_j$ is a positive integer representing the number of dependency data tuples in PLAN[j]. Pursuant to a file format of the project plan, the dependency discovering program may directly filter the project plan or use a separate parser to acquire dependency data of the project plan. In one embodiment of the present invention, a project plan is in Microsoft Excel™ format, and the dependency discovering program looks into data cells for dependency data. In another embodiment of the present invention, a project plan is in Microsoft Excel™ format, and the dependency discovering program uses an Excel data parser to acquire dependency data. In still another embodiment of the present invention, a project plan is in text format, and the dependency discovering program looks into strings for dependency data.

In step 340, the dependency discovering program iterates steps 350 and 360 for each dependency data D[j][k] of the project plan PLAN[j], wherein k counts a number of dependency data tuple in a project plan. Upon completing steps 350 and 360 for all dependency data in the project plan, the dependency discovering program proceeds to step 310 to process next project plan PLAN[j+1] that can be located in the project plan path.

In step 350, the dependency discovering program discovers a dependency of a task that represents that the task is dependent upon a prerequisite task from the dependency data, notated as DEPENDENCY[j][k]=(PREREQUISITE_TASK[j][k], TASK[j][k]). The dependency dictates that the prerequisite task must be performed prior to performing the task. See description of FIG. 3 for details.

In step 360, the dependency discovering program inserts the dependency discovered from step 350 into the master project plan. See description of FIG. 4 for details.

In step 370, the dependency discovering program communicates to the user of the distributed system the master project plan which comprises all dependencies discovered and inserted in steps 350 and 360, noted as a set comprising (DEPENDENCY[1][1], . . . , DEPENDENCY[L][$M_L$]).

Figure 3:
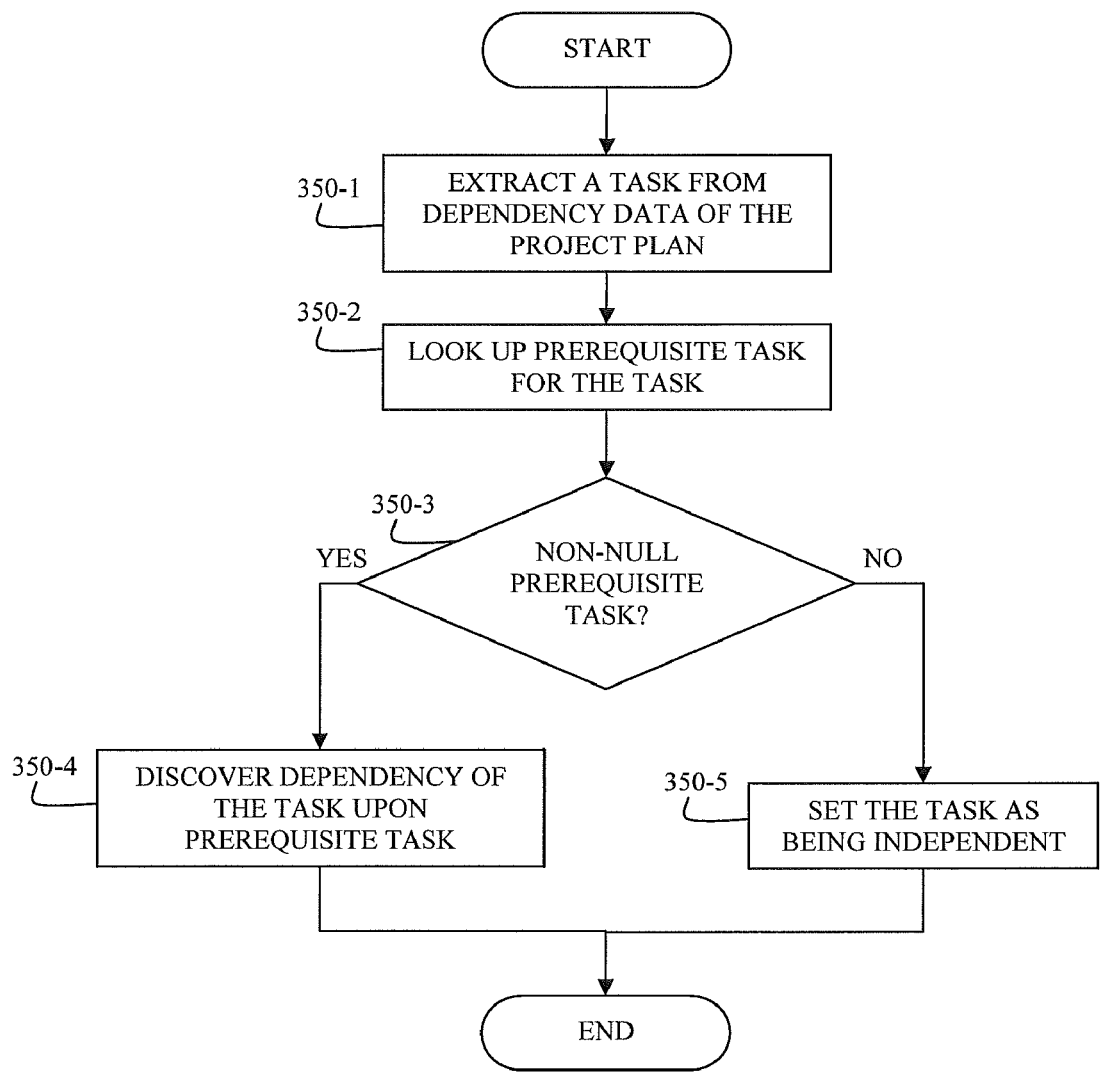
FIG. 3 is a flowchart depicting a dependency discovering subprogram that discovers a dependency for a task in a project plan, in accordance with the embodiments of the present invention.

FIG. 3 is a flowchart depicting a dependency discovering subprogram that discovers a dependency for a task in a project plan, in accordance with the embodiments of the present invention.

In step 350-1, the dependency discovering subprogram extracts a task from dependency data of the project plan.

In step 350-2, the dependency discovering subprogram looks up a prerequisite task for the task in the dependency data.

In step 350-3, the dependency discovering subprogram determines whether the prerequisite task has a non-null value indicating a valid task. If the dependency discovering subprogram determines that the prerequisite task has a non-null value, the dependency discovering subprogram proceeds with step 350-4. If the dependency discovering subprogram determines that the prerequisite task has a null value, the dependency discovering subprogram proceeds with step 350-5.

In step 350-4, the dependency discovering subprogram discovers a dependency of the task as being dependent upon the prerequisite task, which represents that the prerequisite task must be completed prior to performing the task.

In step 350-5, the dependency discovering subprogram discovers a dependency of the task as being independent, which represents that the task can be performed independently.

Figure 4:
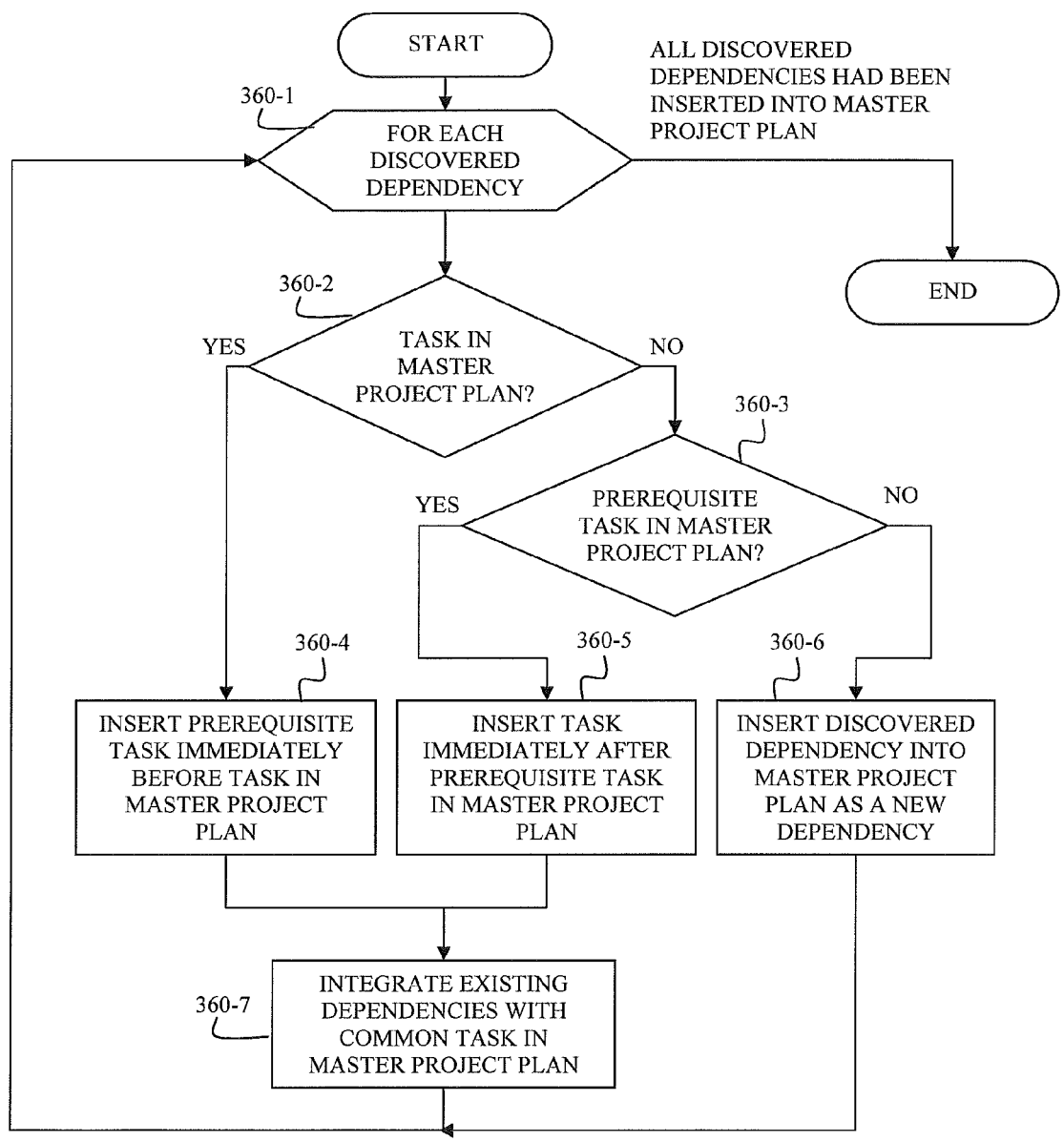
FIG. 4 is a flowchart depicting a dependency inserting subprogram that inserts a dependency discovered in FIG. 3 into a master project plan, in accordance with the embodiments of the present invention.

FIG. 4 is a flowchart depicting a dependency inserting subprogram that inserts a dependency discovered in FIG. 3, supra, into a master project plan, in accordance with the embodiments of the present invention.

In step 360-1, the dependency inserting subprogram iterates steps 360-2 to 360-7 for each dependency found in step 350. If the dependency inserting subprogram determines that all discovered dependencies had been inserted into the master project plan, the dependency inserting subprogram terminates.

In step 360-2, the dependency inserting subprogram determines whether a task in a discovered dependency is already in the master project plan. If the dependency inserting subprogram determines that the task in the discovered dependency is already in the master project plan, the dependency inserting program proceeds to step 360-4. If the dependency inserting subprogram determines that the task in the discovered dependency is not in the master project plan yet, the dependency inserting program proceeds to step 360-3.

In step 360-3, the dependency inserting subprogram determines whether a prerequisite task in the discovered dependency is already in the master project plan. If the dependency inserting subprogram determines that the prerequisite task in the discovered dependency is already in the master project plan, the dependency inserting program proceeds to step 360-5. If the dependency inserting subprogram determines that the prerequisite task in the discovered dependency is not in the master project plan yet, the dependency inserting program proceeds to step 360-6.

In step 360-4, upon determining the task in the discovered dependency is already in the master project plan, the dependency inserting subprogram inserts the prerequisite task in the discovered dependency into a position in the master project plan that immediately precedes the task such that the prerequisite task is performed immediately prior to performing the task in the master project plan pursuant to the discovered dependency. The dependency inserting subprogram proceeds to step 360-7 after inserting the prerequisite task into the master project plan.

In step 360-5, upon determining that the task in the discovered dependency is not in the master project plan yet and that the prerequisite task in the discovered dependency is already in the master project plan, the dependency inserting subprogram inserts the task in the discovered dependency into a position in the master project plan that immediately succeeds the prerequisite task such that the task is performed immediately after performing the prerequisite task in the master project plan pursuant to the discovered dependency. The dependency inserting subprogram proceeds to step 360-7 after inserting the task into the master project plan.

In step 360-6, upon determining that the task in the discovered dependency is not in the master project plan yet and that the prerequisite task in the discovered dependency is not in the master project plan either, the dependency inserting subprogram inserts the discovered dependency into the master project plan as a new dependency by inserting both the prerequisite task and the task in that order into the master project plan. After inserting the new dependency, the dependency inserting subprogram loops back to step 360-1 to insert next dependency discovered in step 350.

In step 360-7, the dependency inserting subprogram integrates the prerequisite task inserted in step 360-4 or the task inserted in step 360-5 with existing dependencies in the master project plan by locating two dependencies with a common task value, extending a first dependency to include a second dependency, and eliminating the second dependency that is included in the first dependency because the second dependency is redundant. After integrating the first dependency and the second dependency with the common task value, the dependency inserting subprogram loops back to step 360-1 to insert next dependency discovered in step 350.

Figure 5:
FIG. 5 is an example of a distributed system with three nodes, each node comprising a project plan and a project plan path, in accordance with the embodiments of the present invention.
Figure 5:
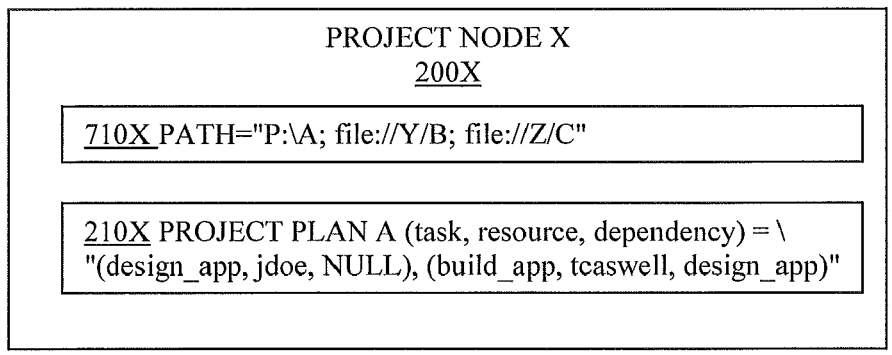
Figure 5:
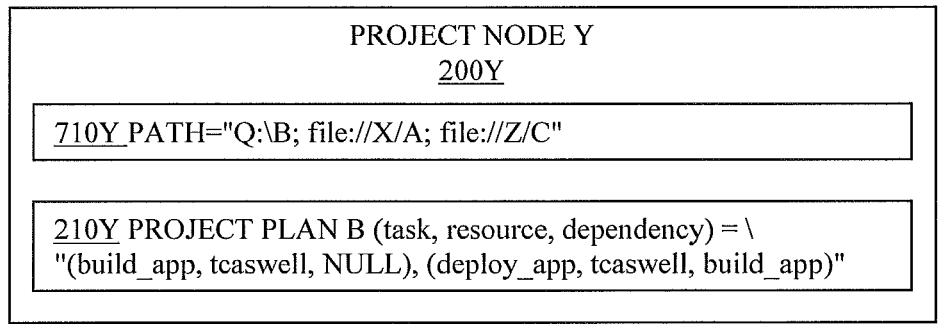
Figure 5:
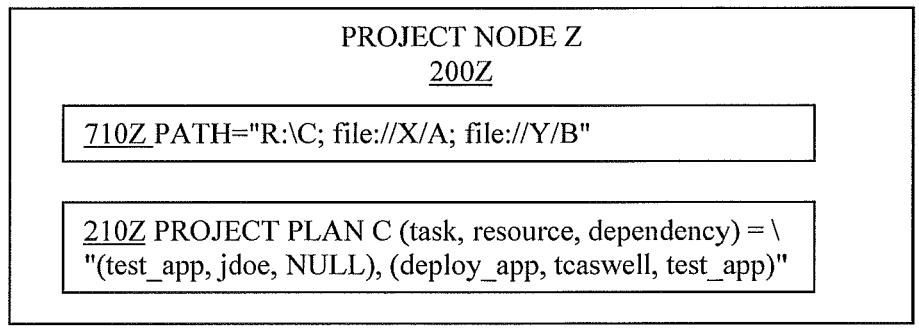

FIG. 5 is an example of a distributed system with three nodes, each node comprising a project plan and a project plan path, in accordance with the embodiments of the present invention.

Three project plans A, B, and C are distributed among three project nodes X, Y, and Z, respectively. In one embodiment of the present invention, the dependency discovering program is executed on project node X. The dependency discovering program locates project plans by reading a project plan path PATH 710X. A first project plan "P:\A" is project plan A 210X which is stored in a local drive P of project node X 200X. After executing steps 310 to 360 of FIG. 2, supra, for a first dependency data tuple (design_app, jdoe, NULL) of the first project plan A, a master project plan has a new dependency (NULL, design_app) because task "design_app" is not dependent to any other task and the master project plan is empty. After executing steps 310 to 360 of FIG. 2, supra, for a second dependency data tuple (build_app, tcaswell, design_app) of the first project plan A 210X, the master project plan has an integrated dependencies (NULL, design_app, build_app) because task "build_app" is dependent on task "design_app," and task "design_app" already exists in the master project plan.

A second project plan "file://Y/B" located by the PATH 710X is project plan B 210Y in project node Y 200Y. After executing steps 310 to 360 of FIG. 2, supra, for a first dependency data tuple (build_app, tcaswell, NULL) of the second project plan B, the master project plan is (NULL, design_app, build_app) because task "build_app" already exists in the master project plan and is independent. After executing steps 310 to 360 of FIG. 2, supra, for a second dependency data tuple (deploy_app, tcaswell, build_app) of the second project plan B, the master project plan has an integrated dependencies (NULL, design_app, build_app, deploy_app) because task "deploy_app" is dependent on task "build_app," and task "build_app" exists in the master project plan.

A third project plan "file://Z/C" located by the PATH 710X is project plan C 210Z in project node Z 200Z. After executing steps 310 to 360 of FIG. 2, supra, for a first dependency data tuple (test_app, jdoe, NULL) of the third project plan C, the master project plan is {(NULL, design_app, build_app, deploy_app), (NULL, test_app)} because a new dependency (NULL, test_app) is inserted into the master project plan without any common task value. After executing steps 310 to 360 of FIG. 2, supra, for a second dependency data tuple (deploy_app, tcaswell, test_app) of the third project plan C, the master project plan has an integrated dependencies (NULL, design_app, build_app, test_app, deploy_app) because task "test_app" is inserted immediately before task "deploy_app."

In another embodiment of the present invention, a task in a dependency data tuple is mapped with a resource, so the same example creates a master project plan {NULL, jdoe(design_app), tcaswell(build_app), jdoe(test_app), tcaswell(deploy_app)} such that discovering not only an order of tasks but also a resource required to perform a task.

Figure 6:
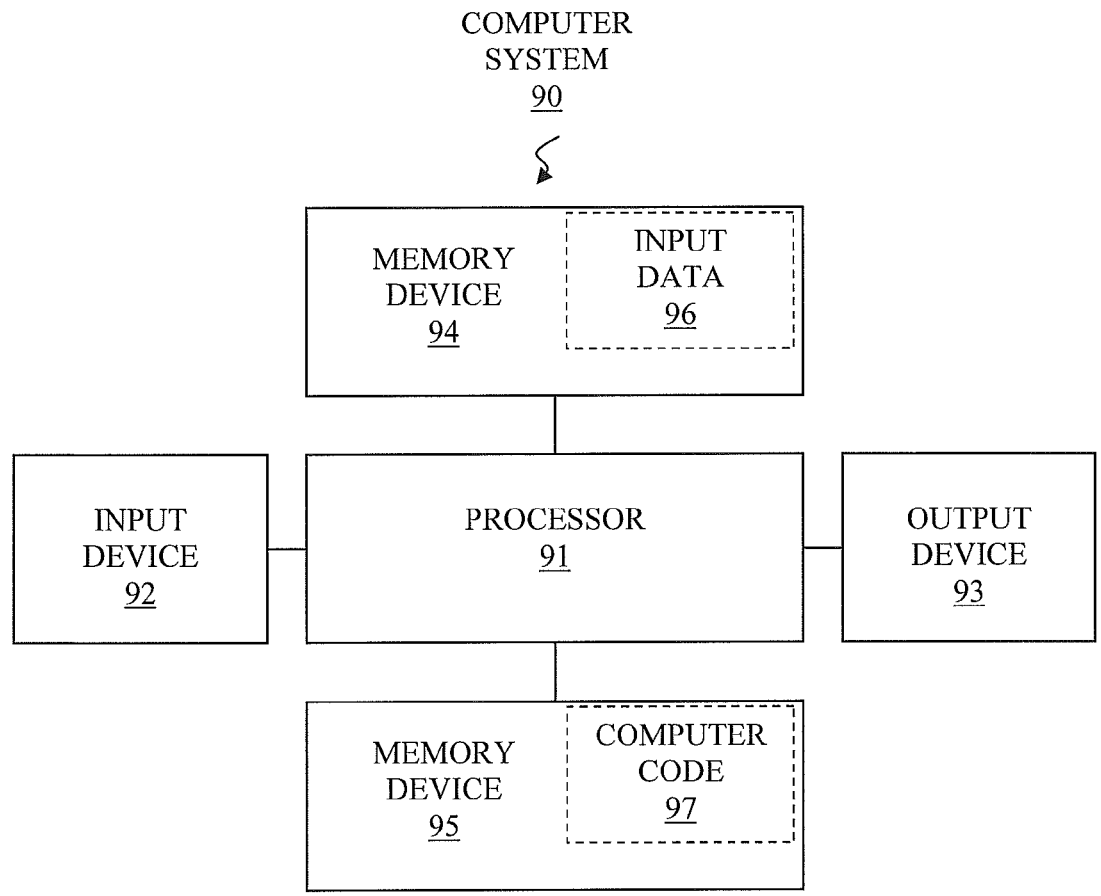
FIG. 6 illustrates a computer system, as a project node, used for discovering dependencies in project plans of a distributed system, in accordance with embodiments of the present invention.

FIG. 6 illustrates a computer system 90, as a project node, used for discovering dependencies in project plans of a distributed system, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 95 includes a computer code 97 which is a computer program that comprises computer-executable instructions. The computer code 97 includes, inter alia, an algorithm used for discovering dependencies in project plans of a distributed system according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may be used as a computer usable storage medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

Any of the components of the present invention can be deployed, managed, serviced, etc. by a service provider that offers to deploy or integrate computing infrastructure with respect to a process for discovering dependencies in project plans of a distributed system of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for discovering dependencies in project plans of a distributed system.

In another embodiment, the invention provides a business method that performs the process steps of the invention on a subscription, advertising and/or fee basis. That is, a service provider, such as a Solution Integrator, can offer to create, maintain, support, etc. a process for discovering dependencies in project plans of a distributed system of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for discovering dependencies among at least two project plans in a distributed system comprising at least one project node that is a computer system, wherein an initial value of a project plan count j is 1, the method comprising:

fetching, from a project plan path, a j-th location value PATH[j] that locates a j-th project plan PLAN[j], the project plan path being stored in a storage medium accessible by a current project node of said at least one project node, wherein the j-th location value PATH[j] is local or remote to the current project node, wherein the project plan path comprises L location values (PATH[1], PATH[2], . . . , PATH[L]) locating all project plans (PLAN[1], PLAN[2], . . . , PLAN[L]), respectively, in the distributed system, wherein L is a positive integer representing the number of project plans in the distributed system, wherein j is a positive integer that is not greater than L;

subsequent to said fetching, opening the j-th project plan PLAN[j] that is located by the j-th location value PATH[j], wherein the j-th project plan PLAN[j] is a file comprising $M_j$ dependency data tuples (D[j][1], . . . , D[j][k], . . . , D[j][$M_j$]), wherein a k-th dependency data tuple of the j-th project plan D[j][k] comprises (TASK[j][k], PREREQUISITE_TASK[j][k]), wherein TASK[j][k] represents a task in a k-th dependency data tuple of the j-th project plan PLAN[j] and PREREQUISITE_TASK[j][k] represents a prerequisite task that need to be completed prior to performing TASK[j][k], wherein $M_j$ is a positive integer representing the number of dependency data tuples in PLAN[j], wherein k is a dependency data tuple count which is a positive integer that is initially 1 and that is not greater than $M_j$;

subsequent to said opening, processing a task loop for each k in the range of 1 to $M_j$, the task loop comprising:

discovering a dependency DEPENDENCY[j][k] for TASK[j][k] comprising an ordered set (PREREQUISITE_TASK[j][k], TASK[j][k]) which defines an order of execution such that TASK[j][k] begins after PREREQUISITE_TASK[j][k] is completed;

subsequent to said discovering, inserting the dependency DEPENDENCY[j][k] from said discovering into a master project plan, wherein the master project plan comprises a collection of all discovered dependencies in the distributed system determining at least one order for performing tasks in said at least two project plans;

subsequent to said inserting, increasing k by one;

subsequent to said increasing k, iteratively looping back to said discovering, said inserting, and said increasing k, while k is not greater than $M_j$; and upon k exceeding $M_j$, exiting the task loop;

subsequent to said processing, increasing j by one;

subsequent to said increasing j, iteratively looping back to said fetching, said opening, said processing, and said increasing j, while j is not greater than L; and upon j exceeding L, communicating the master project plan to a user of the distributed system, wherein the current project node performs said fetching, said opening, said processing, said increasing j, said looping, and said communicating.

2. The method of claim 1, said discovering the dependency DEPENDENCY[j][k] comprising:

extracting TASK[j][k] and PREREQUISITE_TASK[j][k] from the k-th dependency data tuple of the j-th project plan D[j][k];

subsequent to said extracting, determining whether PREREQUISITE_TASK[j][k] has a non-null value; and responsive to determining that PREREQUISITE_TASK[j][k] has a non-null value, discovering the dependency DEPENDENCY[j][k] for TASK[j][k] as the ordered set (PREREQUISITE_TASK[j][k], TASK[j][k]) representing that TASK[j][k] begins after PREREQUISITE_TASK[j][k] is completed.

3. The method of claim 1, said discovering the dependency DEPENDENCY[j][k] comprising:

extracting TASK[j][k] and PREREQUISITE_TASK[j][k] from the k-th dependency data tuple of the j-th project plan D[j][k];

subsequent to said extracting, determining whether PREREQUISITE_TASK[j][k] has a non-null value; and responsive to determining that PREREQUISITE_TASK[j][k] has a null value, discovering the dependency DEPENDENCY[j][k] as the ordered set (NULL, TASK[j][k]) representing that TASK[j][k] begins independently from any other task.

4. The method of claim 1, wherein the k-th dependency data tuple of the j-th project plan D[j][k] further comprises RESOURCE[j][k], wherein RESOURCE[j][k] represents a resource that is required to perform TASK[j][k].

5. The method of claim 1, wherein the k-th dependency data tuple of the j-th project plan D[j][k] further comprises RESOURCE[p][q], wherein RESOURCE[p][q] represents a resource that is required to perform PREREQUISITE_TASK[j][k], wherein p is a positive integer that is not greater than L, 6. The method of claim 1, said inserting comprising:
receiving the dependency DEPENDENCY[j][k] for TASK [j][k] from said discovering;
determining whether TASK[j][k] is already in the master project plan;
responsive to determining that TASK[j][k] is already in the master project plan, inserting PREREQUISITE_TASK [j][k] immediately before TASK[j][k]; and
subsequent to said inserting PREREQUISITE_TASK[j][k], integrating all dependencies in the master project plan which comprises TASK[j][k] into a single dependency.

7. The method of claim 1, said inserting comprising:
receiving the dependency DEPENDENCY[j][k] for TASK [j][k] from said discovering;
determining whether TASK[j][k] is already in the master project plan;
responsive to determining that TASK[j][k] is not in the master project plan yet, determining whether PREREQUISITE_TASK[j][k] is in the master project plan;
responsive to determining that PREREQUISITE_TASK[j][k] is in the master project plan, inserting TASK[j][k] immediately after PREREQUISITE_TASK[j][k]; and
subsequent to said inserting TASK[j][k], integrating all dependencies in the master project plan which comprises PREREQUISITE_TASK[j][k] into a single dependency.

8. The method of claim 1, said inserting comprising:
receiving the dependency DEPENDENCY[j][k] for TASK [j][k] from said discovering;
determining whether TASK[j][k] is already in the master project plan;
responsive to determining that TASK[j][k] is not in the master project plan yet, determining whether PREREQUISITE_TASK[j][k] is in the master project plan; and
responsive to determining that PREREQUISITE_TASK[j][k] is not in the master project plan, inserting the dependency DEPENDENCY[j][k] into the master project plan as a new dependency.

9. A computer system comprising a processor and a computer readable memory unit coupled to the processor, said memory unit containing instructions that when executed by the processor implement a method for discovering dependencies among at least two project plans in a distributed system comprising at least one project node that is a computer system, wherein an initial value of a project plan count j is 1, the method comprising:
fetching, from a project plan path, a j-th location value PATH[j] that locates a j-th project plan PLAN[j], the project plan path being stored in a storage medium accessible by a current project node of said at least one project node, wherein the j-th location value PATH[j] is local or remote to the current project node, wherein the project plan path comprises L location values (PATH[1], PATH[2], . . . , PATH[L]) locating all project plans (PLAN[1], PLAN[2], . . . , PLAN[L]), respectively, in the distributed system, wherein L is a positive integer representing the number of project plans in the distributed system, wherein j is a positive integer that is not greater than L;
subsequent to said fetching, opening the j-th project plan PLAN[j] that is located by the j-th location value PATH [j], wherein the j-th project plan PLAN[j] is a file comprising $M_j$ dependency data tuples (D[j][1], . . . , D[j][k], . . . , D[j][$M_j$]), wherein a k-th dependency data tuple of the j-th project plan D[j][k] comprises (TASK [j][k], PREREQUISITE_TASK[j][k]), wherein TASK [j][k] represents a task in a k-th dependency data tuple of the j-th project plan PLAN[j] and PREREQUISITE_TASK[j][k] represents a prerequisite task that need to be completed prior to performing TASK[j][k], wherein $M_j$ is a positive integer representing the number of dependency data tuples in PLAN[j], wherein k is a dependency data tuple count which is a positive integer that is initially 1 and that is not greater than $M_j$;
subsequent to said opening, processing a task loop for each k in the range of 1 to $M_j$, the task loop comprising:
discovering a dependency DEPENDENCY[j][k] for TASK[j][k] comprising an ordered set (PREREQUISITE_TASK[j][k], TASK[j][k]) which defines an order of execution such that TASK[j][k] begins after PREREQUISITE_TASK[j][k] is completed;
subsequent to said discovering, inserting the dependency DEPENDENCY[j][k] from said discovering into a master project plan, wherein the master project plan comprises a collection of all discovered dependencies in the distributed system determining at least one order for performing tasks in said at least two project plans;
subsequent to said inserting, increasing k by one;
subsequent to said increasing k, iteratively looping back to said discovering, said inserting, and said increasing k, while k is not greater than $M_j$; and
upon k exceeding $M_j$, exiting the task loop;
subsequent to said processing, increasing j by one;
subsequent to said increasing j, iteratively looping back to said fetching, said opening, said processing, and said increasing j, while j is not greater than L; and
upon j exceeding L, communicating the master project plan to a user of the distributed system,
wherein the current project node performs said fetching, said opening, said processing, said increasing j, said looping, and said communicating.

10. A computer program product, comprising a computer usable storage medium having a computer readable program code stored thereon, said computer readable program code containing instructions that when executed by a processor of a computer system implement a method for discovering dependencies among at least two project plans in a distributed system comprising at least one project node that is a computer system, wherein an initial value of a project plan count$_j$ is 1, the method comprising:
fetching, from a project plan path, a j-th location value PATH[j] that locates a j-th project plan PLAN[j], the project plan path being stored in a storage medium accessible by a current project node of said at least one project node, wherein the j-th location value PATH[j] is local or remote to the current project node, wherein the project plan path comprises L location values (PATH[1], PATH[2] PATH[L]) locating all project plans (PLAN[1], PLAN[2] PLAN[L]), respectively, in the distributed system, wherein L is a positive integer representing the number of project plans in the distributed system, wherein j is a positive integer that is not greater than L;
subsequent to said fetching, opening the j-th project plan PLAN[j] that is located by the j-th location value PATH [j], wherein the j-th project plan PLAN[j] is a file comprising $M_j$ dependency data tuples (D[j] [1] . . . D[j] [k] . . . D[j] [$M_j$]), wherein a k-th dependency data tuple of the j-th project plan D[j] [k] comprises (TASK[j] [k], PREREQUISITE_TASK[j] [k]), wherein TASK[j] [k]

represents a task in a k-th dependency data tuple of the j-th project plan PLAN[j] and PREREQUISITE_TASK [j] [k] represents a prerequisite task that need to be completed prior to performing TAS K[j] [k], wherein $M_j$ is a positive integer representing the number of dependency data tuples in PLAN[j], wherein k is a dependency data tuple count which is a positive integer that is initially 1 and that is not greater than $M_j$;

subsequent to said opening, processing a task loop for each k in the range of 1 to $M_j$, the task loop comprising:

discovering a dependency DEPENDENCY[j] [k] for TASK[j] [k] comprising an ordered set (PREREQUIS ITE_TAS K[j] [k], TAS K[j] [k]) which defines an order of execution such that TASK[j] [k] begins after PREREQUISITE_TASK[j] [k] is completed;

subsequent to said discovering, inserting the dependency DEPENDENCY[j] [k] from said discovering into a master project plan, wherein the master project plan comprises a collection of all discovered dependencies in the distributed system determining at least one order for performing tasks in said at least two project plans;

subsequent to said inserting, increasing k by one;

subsequent to said increasing k, iteratively looping back to said discovering, said inserting, and said increasing k, while k is not greater than $M_j$; and upon k exceeding $M_j$, exiting the task loop;

subsequent to said processing, increasing j by one;

subsequent to said increasing j, iteratively looping back to said fetching, said opening, said processing, and said increasing j, while j is not greater than L; and upon j exceeding L, communicating the master project plan to a user of the distributed system, wherein the current project node performs said fetching, said opening, said processing, said increasing j, said looping, and said communicating.

11. The computer program product of claim 10, said discovering the dependency DEPENDENCY[j][k] comprising:
extracting TASK[j][k] and PREREQUISITE_TASK[j][k] from the k-th dependency data tuple of the j-th project plan D[j][k];
subsequent to said extracting, determining whether PREREQUISITE_TASK[j][k] has a non-null value; and
responsive to determining that PREREQUISITE_TASK[j][k] has a non-null value, discovering the dependency DEPENDENCY[j][k] for TASK[j][k] as the ordered set (PREREQUISITE_TASK[j][k], TASK[j][k]) representing that TASK[j][k] begins after PREREQUISITE_TASK[j][k] is completed.

12. The computer program product of claim 10, said discovering the dependency DEPENDENCY[j][k] comprising:
extracting TASK[j][k] and PREREQUISITE_TASK[j][k] from the k-th dependency data tuple of the j-th project plan D[j][k];
subsequent to said extracting, determining whether PREREQUISITE_TASK[j][k] has a non-null value; and
responsive to determining that PREREQUISITE_TASK[j][k] has a null value, discovering the dependency DEPENDENCY[j][k] as the ordered set (NULL, TASK[j][k]) representing that TASK[j][k] begins independently from any other task.

13. The computer program product of claim 10, wherein the k-th dependency data tuple of the j-th project plan D[j][k] further comprises RESOURCE[j][k], wherein RESOURCE[j][k] represents a resource that is required to perform TASK[j][k].

14. The computer program product of claim 10, wherein the k-th dependency data tuple of the j-th project plan D[j][k] further comprises RESOURCE[p][q], wherein RESOURCE[p][q] represents a resource that is required to perform PREREQUISITE_TASK[j][k], wherein p is a positive integer that is not greater than L, and wherein q is a positive integer that is not greater than M representing a maximum number of dependency data tuples in any project plan.

15. The computer program product of claim 10, said inserting comprising:
receiving the dependency DEPENDENCY[j][k] for TASK[j][k] from said discovering;
determining whether TASK[j][k] is already in the master project plan;
responsive to determining that TASK[j][k] is already in the master project plan, inserting PREREQUISITE_TASK[j][k] immediately before TASK[j][k]; and
subsequent to said inserting PREREQUISITE_TASK[j][k], integrating all dependencies in the master project plan which comprises TASK[j][k] into a single dependency.

16. The computer program product of claim 10, said inserting comprising:
receiving the dependency DEPENDENCY[j][k] for TASK[j][k] from said discovering;
determining whether TASK[j][k] is already in the master project plan;
responsive to determining that TASK[j][k] is not in the master project plan yet, determining whether PREREQUISITE_TASK[j][k] is in the master project plan;
responsive to determining that PREREQUISITE_TASK[j][k] is in the master project plan, inserting TASK[j][k] immediately after PREREQUISITE_TASK[j][k]; and
subsequent to said inserting TASK[j][k], integrating all dependencies in the master project plan which comprises PREREQUISITE_TASK[j][k] into a single dependency.

17. The computer program product of claim 10, said inserting comprising:
receiving the dependency DEPENDENCY[j][k] for TASK[j][k] from said discovering;
determining whether TASK[j][k] is already in the master project plan;
responsive to determining that TASK[j][k] is not in the master project plan yet, determining whether PREREQUISITE_TASK[j][k] is in the master project plan; and
responsive to determining that PREREQUISITE_TASK[j][k] is not in the master project plan, inserting the dependency DEPENDENCY[j][k] into the master project plan as a new dependency.

18. A process for supporting computer infrastructure, said process comprising providing at least one support service for at least one of creating, integrating, hosting, maintaining, and deploying computer-readable code in a computing system, wherein the code in combination with the computing system is capable of performing a method for discovering dependencies among at least two project plans in a distributed system comprising at least one project node that is a computer system, wherein an initial value of a project plan count j is 1, the method comprising:
fetching, from a project plan path, a j-th location value PATH[j] that locates a j-th project plan PLAN[j], the project plan path being stored in a storage medium accessible by a current project node of said at least one project node, wherein the j-th location value PATH[j] is local or remote to the current project node, wherein the project plan path comprises L location values (PATH[1], PATH[2], . . . , PATH[L]) locating all project plans (PLAN[1], PLAN[2], . . . , PLAN[L]), respectively, in the distributed system, wherein L is a positive integer representing the number of project plans in the distributed system, wherein j is a positive integer that is not greater than L;

subsequent to said fetching, opening the j-th project plan PLAN[j] that is located by the j-th location value PATH [j], wherein the j-th project plan PLAN[j] is a file comprising $M_j$ dependency data tuples (D[j][1], ..., D[j][k], ..., D[j][$M_j$]), wherein a k-th dependency data tuple of the j-th project plan D[j][k] comprises (TASK [j][k], PREREQUISITE_TASK[j][k]), wherein TASK [j][k] represents a task in a k-th dependency data tuple of the j-th project plan PLAN[j] and PREREQUISITE_TASK[j][k] represents a prerequisite task that need to be completed prior to performing TASK [j][k], wherein $M_j$ is a positive integer representing the number of dependency data tuples in PLAN[j], wherein k is a dependency data tuple count which is a positive integer that is initially 1 and that is not greater than $M_j$;

subsequent to said opening, processing a task loop for each k in the range of 1 to $M_j$, the task loop comprising:
 discovering a dependency DEPENDENCY[j][k] for TASK[j][k] comprising an ordered set (PREREQUISITE_TASK[j][k], TASK[j][k]) which defines an order of execution such that TASK[j][k] begins after PREREQUISITE_TASK[j][k] is completed;
 subsequent to said discovering, inserting the dependency DEPENDENCY[j][k] from said discovering into a master project plan, wherein the master project plan comprises a collection of all discovered dependencies in the distributed system determining at least one order for performing tasks in said at least two project plans;
 subsequent to said inserting, increasing k by one;
 subsequent to said increasing k, iteratively looping back to said discovering, said inserting, and said increasing k, while k is not greater than $M_j$; and
 upon k exceeding $M_j$, exiting the task loop;

subsequent to said processing, increasing j by one;
subsequent to said increasing j, iteratively looping back to said fetching, said opening, said processing, and said increasing j, while j is not greater than L; and
upon j exceeding L, communicating the master project plan to a user of the distributed system, wherein the current project node performs said fetching, said opening, said processing, said increasing j, said looping, and said communicating.

19. The process of claim 18, said discovering the dependency DEPENDENCY[j][k] comprising:
 extracting TASK[j][k] and PREREQUISITE_TASK[j][k] from the k-th dependency data tuple of the j-th project plan D[j][k];
 subsequent to said extracting, determining whether PREREQUISITE_TASK[j][k] has a non-null value; and
 responsive to determining that PREREQUISITE_TASK[j][k] has a non-null value, discovering the dependency DEPENDENCY[j][k] for TASK[j][k] as the ordered set (PREREQUISITE_TASK[j][k], TASK[j][k]) representing that TASK[j][k] begins after PREREQUISITE_TASK[j][k] is completed.

20. The process of claim 18, said discovering the dependency DEPENDENCY[j][k] comprising:
 extracting TASK[j][k] and PREREQUISITE_TASK[j][k] from the k-th dependency data tuple of the j-th project plan D[j][k];
 subsequent to said extracting, determining whether PREREQUISITE_TASK[j][k] has a non-null value; and
 responsive to determining that PREREQUISITE_TASK[j][k] has a null value, discovering the dependency DEPENDENCY[j][k] as the ordered set (NULL, TASK [j][k]) representing that TASK[j][k] begins independently from any other task.

21. The process of claim 18, wherein the k-th dependency data tuple of the j-th project plan D[j][k] further comprises RESOURCE[j][k], wherein RESOURCE[j][k] represents a resource that is required to perform TASK[j][k].

22. The process of claim 18, wherein the k-th dependency data tuple of the j-th project plan D[j][k] further comprises RESOURCE[p][q], wherein RESOURCE[p][q] represents a resource that is required to perform PREREQUISITE_TASK [j][k], wherein p is a positive integer that is not greater than L, and wherein q is a positive integer that is not greater than M representing a maximum number of dependency data tuples in any project plan.

23. The process of claim 18, said inserting comprising:
 receiving the dependency DEPENDENCY[j][k] for TASK [j][k] from said discovering;
 determining whether TASK[j][k] is already in the master project plan;
 responsive to determining that TASK[j][k] is already in the master project plan, inserting PREREQUISITE_TASK [j][k] immediately before TASK[j][k]; and
 subsequent to said inserting PREREQUISITE_TASK[j] [k], integrating all dependencies in the master project plan which comprises TASK[j][k] into a single dependency.

24. The process of claim 18, said inserting comprising:
 receiving the dependency DEPENDENCY[j][k] for TASK [j][k] from said discovering;
 determining whether TASK[j][k] is already in the master project plan;
 responsive to determining that TASK[j][k] is not in the master project plan yet, determining whether PREREQUISITE_TASK[j][k] is in the master project plan;
 responsive to determining that PREREQUISITE_TASK[j] [k] is in the master project plan, inserting TASK[j][k] immediately after PREREQUISITE_TASK[j][k]; and
 subsequent to said inserting TASK[j][k], integrating all dependencies in the master project plan which comprises PREREQUISITE_TASK[j][k] into a single dependency.

25. The process of claim 18, said inserting comprising:
 receiving the dependency DEPENDENCY[j][k] for TASK [j][k] from said discovering;
 determining whether TASK[j][k] is already in the master project plan;
 responsive to determining that TASK[j][k] is not in the master project plan yet, determining whether PREREQUISITE_TASK[j][k] is in the master project plan; and
 responsive to determining that PREREQUISITE_TASK[j] [k] is not in the master project plan, inserting the dependency DEPENDENCY[j][k] into the master project plan as a new dependency.

* * * * *